United States Patent [19]
Harrington

[11] Patent Number: 5,153,576
[45] Date of Patent: Oct. 6, 1992

[54] MAPPING OF COLOR IMAGES TO BLACK-AND-WHITE TEXTURED IMAGES

[75] Inventor: Steven J. Harrington, Holley, N.Y.

[73] Assignee: Xerox Corporation, Stamford, Conn.

[21] Appl. No.: 574,144

[22] Filed: Aug. 29, 1990

[51] Int. Cl.$^5$ .............................................. G09G 3/36
[52] U.S. Cl. .................... 340/793; 340/703; 358/456; 358/75
[58] Field of Search .............. 340/701, 703, 793; 358/456, 459, 80, 81, 82, 75, 76

[56] References Cited

U.S. PATENT DOCUMENTS

| | | | |
|---|---|---|---|
| 4,225,861 | 9/1980 | Langdon, Jr. et al. | 340/703 |
| 4,499,489 | 2/1985 | Gall et al. | 358/75 |
| 4,688,031 | 8/1987 | Haggerty | 340/793 |
| 4,700,235 | 10/1987 | Gall | 358/75 |
| 4,703,318 | 10/1987 | Haggerty | 346/793 |
| 4,741,046 | 4/1988 | Matsunawa et al. | 382/9 |
| 4,888,713 | 12/1989 | Falk | 364/522 |
| 4,970,586 | 11/1990 | Sunda et al. | 358/75 |

OTHER PUBLICATIONS

IBM Technical Disclosure Bulletin, "Optimal Digital Halftone Pattern Generation Method", Feb. 1975, pp. 2779–2780.
Addison-Wesley Publishing Company, "Fundamentals of Interactive Computer Graphics", Foley et al., Jul. 1984, pp. 597–602.

Primary Examiner—Alvin E. Oberley
Assistant Examiner—Jick Chin
Attorney, Agent, or Firm—Oliff & Berridge

[57] ABSTRACT

Mapping an image comprised of a plurality of pixels from color to black-and-white includes determining, on a pixel-by-pixel basis, the amount of a plurality of color components in a color image. Each color component is applied to its own halftone screen, each screen being comprised of a plurality of cells. Certain cells areas of each screen having been allocated to a single color component to yield texture patterns. The halftone screens of the color components are combined to yield a black-and-white textured image.

6 Claims, 6 Drawing Sheets

| | | | | | | | |
|---|---|---|---|---|---|---|---|
| 11/13 | | | | 4/13 | | | |
| 9/13 | | | | 6/13 | | | |
| 7/13 | | | | 8/13 | | | |
| 5/13 | | | | 10/13 | | | |
| 3/13 | | | | 12/13 | | | |
| 1/13 | | | | 2/13 | | | | redHTcell

FIG. 1A

| | | | | | | | |
|---|---|---|---|---|---|---|---|
| | 32/33 | 9/33 | 23/33 | | 31/33 | 10/33 | 24/33 |
| | 7/33 | 30/33 | 16/33 | | 8/33 | 29/33 | 15/33 |
| | 22/33 | 14/33 | 28/33 | | 21/33 | 13/33 | 27/33 |
| | 12/33 | 20/33 | 6/33 | | 11/33 | 19/33 | 5/33 |
| | 25/33 | 4/33 | 18/33 | | 26/33 | 3/33 | 17/33 |
| | 2/33 | | | | 1/33 | | | greenHTcell

FIG. 1B

| | | | | | | | |
|---|---|---|---|---|---|---|---|
| | | | | | | | |
| | | | | | | | |
| | | | | | | | |
| | | | | | | | |
| | | | | | | | |
| | | 1/5 | 3/5 | | | 2/5 | 4/5 | blueHTcell

FIG. 1C

MAPPING OF COLOR IMAGES TO BLACK-AND-WHITE TEXTURED IMAGES

BACKGROUND OF THE INVENTION

1. Field of the Invention

The present invention relates to the mapping of color images to black-and-white images and, more particularly, to the mapping of color images to black-and-white textured images comprising texture patterns which vary smoothly over color space.

2. Description of the Related Art

As the creation and display of computer-generated colored images continues to grow, methods for printing these images become increasingly important. While printing in full color may give the best rendition of a colored image, for reasons of availability, cost or speed of printing, one may sometimes choose to print the image on a black-and-white device. When a black-and-white device is used, some mapping must be employed to reduce the colors in the original image to those which the printer can produce. Typically, this is done by first mapping the full color image to a gray level image. The luminance of each pixel in the original image is usually used as the value for the corresponding gray level pixel. This is the mapping which occurs in black-and-white photographs and in black-and-white television. For pictorial images, most of the information is in the luminance channel, and this mapping works quite well. A black-and-white printer would next apply a halftone to the gray level image to yield a pattern of black-and-white dots which appear gray when viewed from a distance. The halftone patterns are designed to minimize the appearance of textures from the halftone screen. Again, this works well for pictorial images where one is interested in the apparent gray level of a point and not the method used to create it.

Many computer-generated colored images, however, such as those arising from business or presentation graphics, use color in a manner different than that used in pictorial images. In these images, the colors chosen are usually bright and highly saturated for maximum visual impact. Colors are differentiated primarily by hue. For these images, the mapping to luminance is much less appropriate. Information lies in the hue rather than the luminance, and while light colors look light, and dark colors look dark, very different colors (e.g. light blue and green) can have the same luminance and be indistinguishable when mapped to a gray level.

One solution to this, when there are a few specific colors, has been to select a corresponding set of texture patterns and to replace each color by a given texture. This solution is limited to only those colors for which texture patterns have been designed.

The related art describes mapping of color images to black-and-white images.

U.S. Pat. Nos. 4,688,031 and 4,703,318 to Haggerty disclose systems for transforming a color image to a monochromatic image having a particular pattern of light and dark dots which correspond to the original color of an area of the image. The dot patterns provide differing textural appearance for each color. Transformation of a color image to a monochromatic image is performed by replacing each area of the color image with a monochromatic dot pattern corresponding to a color pattern mask.

U.S. Pat. No. 4,225,861 to Langdon, Jr. et al discloses a method and apparatus for displaying texture in color patterns of a raster scanned display surface.

U.S. Pat. No. 4,741,046 to Matsunawa et al discloses a method of discriminating pictures wherein a texture of an image block is used to sort out similar image blocks. Once sorted, the blocks can be extracted from the image. A background pixel is determined using thresholding.

U.S. Pat. No. 4,888,713 to Falk discloses a surface detailed mapping system wherein textures are used to create a more realistic three-dimensional image on a two-dimensional display. A texture can be stored in memory and then used at a later date.

While the related art recognizes that color images can be mapped to black-and-white images using textured patterns, the art does not recognize that any color in the three-dimensional space can be mapped to a distinct texture on a pixel-by-pixel basis.

OBJECTS AND SUMMARY OF THE INVENTION

Color space is a three-dimensional space, and a color is parameterized by three numbers. The actual numbers depend on the coordinate system (or color model) being used. The problem is to map the three numbers representing the color of a pixel to a black or white value for that pixel. The scheme should map an area of pixels with the same color value into the pattern or texture which corresponds to that color value. In the past, the method was to first combine the three numbers into a single number (the luminance), and then compare the number to a digital halftone screen to get a binary black or white result.

Accordingly, one object of the present invention is the ability to map color images to black-and-white images in a manner preserving luminance information.

Another object of the present invention is to map color images to black-and-white images in a manner assigning distinct textures to different hues.

Another object of the present invention is to map color images to black-and-white texture images in a manner yielding areas in which texture changes smoothly.

A further object of the present invention is to map color images to black-and-white texture images in a manner useful in both pictorial images and presentation graphics images.

To achieve the foregoing and other objects and advantages, and to overcome the shortcomings discussed above, a method and apparatus for mapping a color image to a black-and-white image is described. A color image comprising a plurality of pixels is mapped to a black-and-white texture image by first determining, on a pixel-by-pixel basis, the amount of a plurality of color components in the color image. Each color component is applied to its own halftone screen, each screen being comprised of a plurality of cells. Certain cell areas of each screen are allocated to a single color component to yield texture patterns. The halftone screens of the color components are combined to yield a black-and-white texture image. Luminance can be selectively preserved if desired.

BRIEF DESCRIPTION OF THE DRAWINGS

The invention will be described in detail with reference to the following drawings in which like reference numerals refer to like elements and wherein:

FIGS. 1A, 1B and 1C illustrate halftone cells for the three color components red, green and blue; respectively

BRIEF DESCRIPTION OF THE PREFERRED EMBODIMENTS

Figure 2:
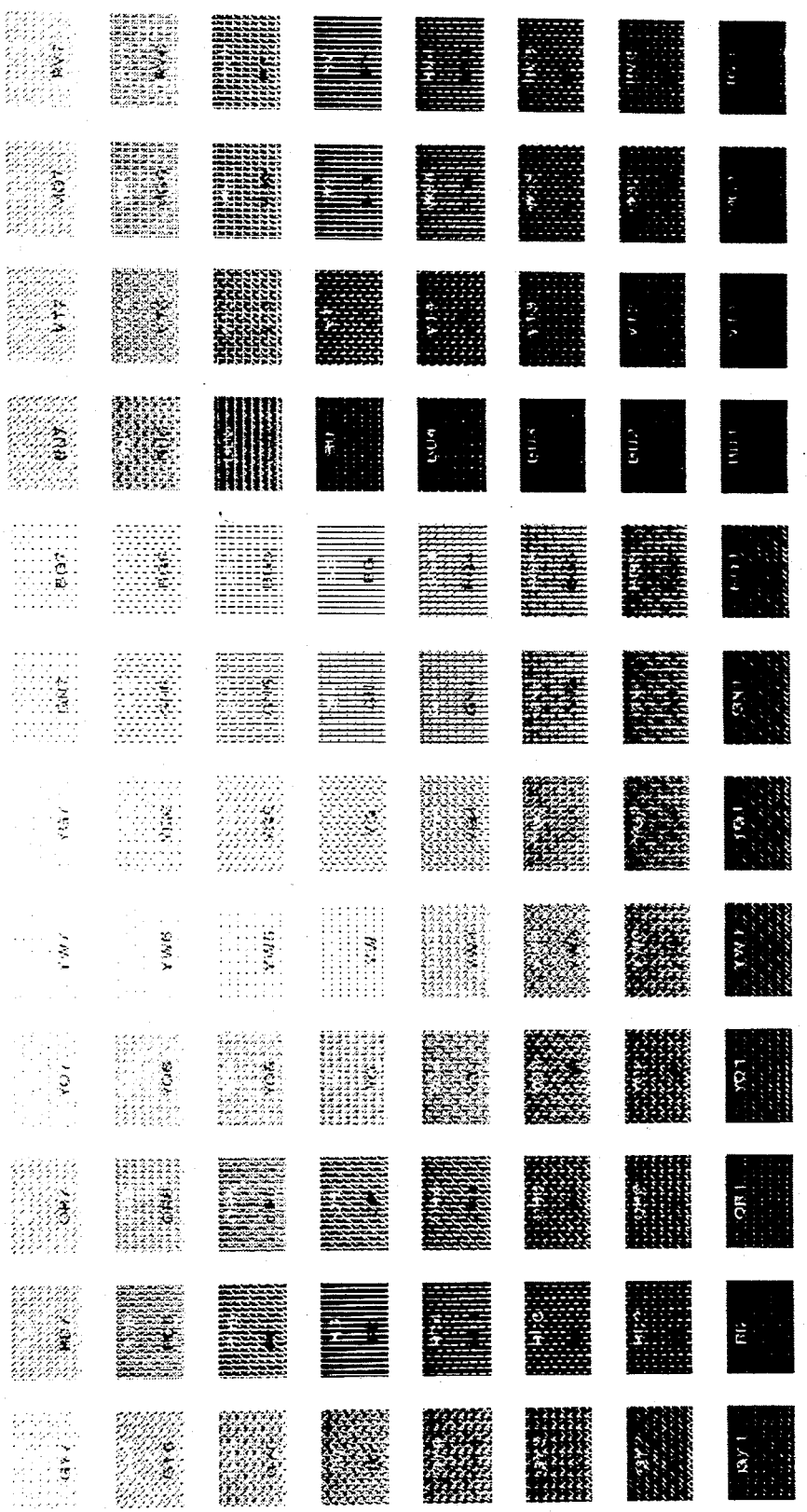
FIG. 2 is a color chart illustrating how different hues, tints and shades are mapped to their various textures.

Referring now the drawings and particularly to FIGS. 1A-1C thereof, there are shown exemplary halftone cells for each of three color components. For illustrative purposes, the color components red, green and blue are illustrated. An original color image is comprised of a plurality of colors specified by red, green and blue parameters. These parameters are assumed to range between 0 and 1, 0 being the darkest and 1 being the lightest. The color primaries and white point are assumed to be chosen such that the luminance of the original color image is approximately given by:

$$y \approx \tfrac{1}{4} + \tfrac{2}{3} g + 1/12\ b.$$

FIGS. 1A-1C illustrate a 6×8 element digital halftone cell providing 48 entries per cell. In the Figures, 12 of the cells are dedicated to the red color component, 32 of the cells are dedicated to the green color component and 4 of the cells are dedicated to the blue color component. Blue is generally dedicated fewer components because the eye is less sensitive to blue. The cell areas dedicated to the three color parameters are not of equal size, for purposes of this illustration, to enable allocation of cell areas according to the luminance contribution of each component. The overall luminance behavior can thus be preserved by the color to texture mapping.

A digital halftone-like operation is performed by comparing the color component value at x, y, for a pixel against the corresponding threshold value r, g or b in the halftone cell for that component. Fractional threshold values, for pixel positions within a cell are shown in FIGS. 1A-1C. Pixel positions shown without a threshold value have a threshold of 1. If the pixel value is greater than the threshold, then white is selected by that component. If any of the three components generate white, then white is printed, otherwise black is printed. The code to implement this test is as follows:

```
x1 = x MOD cellWidth;

y1 = y MOD cellHeight;

if (redHTcell[x1, y1] < r or greenHTcell[x1, y1] < g or blueHTcell[x1, y1] < b)

then Frame[x, y] = white else Frame[x, y] = black;
```

Since pixel color values are never greater than 1, those cell elements with 1 as their threshold (the unlabeled pixel positions) will never contribute white to the image. This prevents color components from contributing outside of their designated areas.

The particular pattern chosen in FIGS. 1A-1C draws white vertical lines for red, horizontal dashed lines for blue, and diagonal patterns for green. Other patterns may be devised for changing the allocation of areas within the cell and the distribution of thresholds within an area.

Each of the three color components is applied to its own halftone screen to yield three binary values, which can be ORed together to yield the black or white result. The halftone screens are designed so as to allocate areas of the halftone cell to each of the three parameters. Thus, each parameter has control of a particular area of the halftone cell. It is this allocation of areas which results in the textures. If the first parameter such as red as shown in FIG. 1A were allocated a vertical column of cell elements, then colors with a component of this parameter will yield patterns with dashed or solid vertical lines. Similarly, the third parameter such as blue shown in FIG. 1C might be allocated a horizontal row of cell elements. Color containing the third parameter would yield textures with horizontal lines. Colors containing both the first and third color components would give a cross-hatched pattern with both horizontal and vertical lines.

FIG. 2 illustrates a textured rendition of a color chart. The figure illustrates how hues, tints and shades are mapped to textures. The textured color chart preserves luminance while providing a different appearance for each entry on the color chart.

Figure 3:
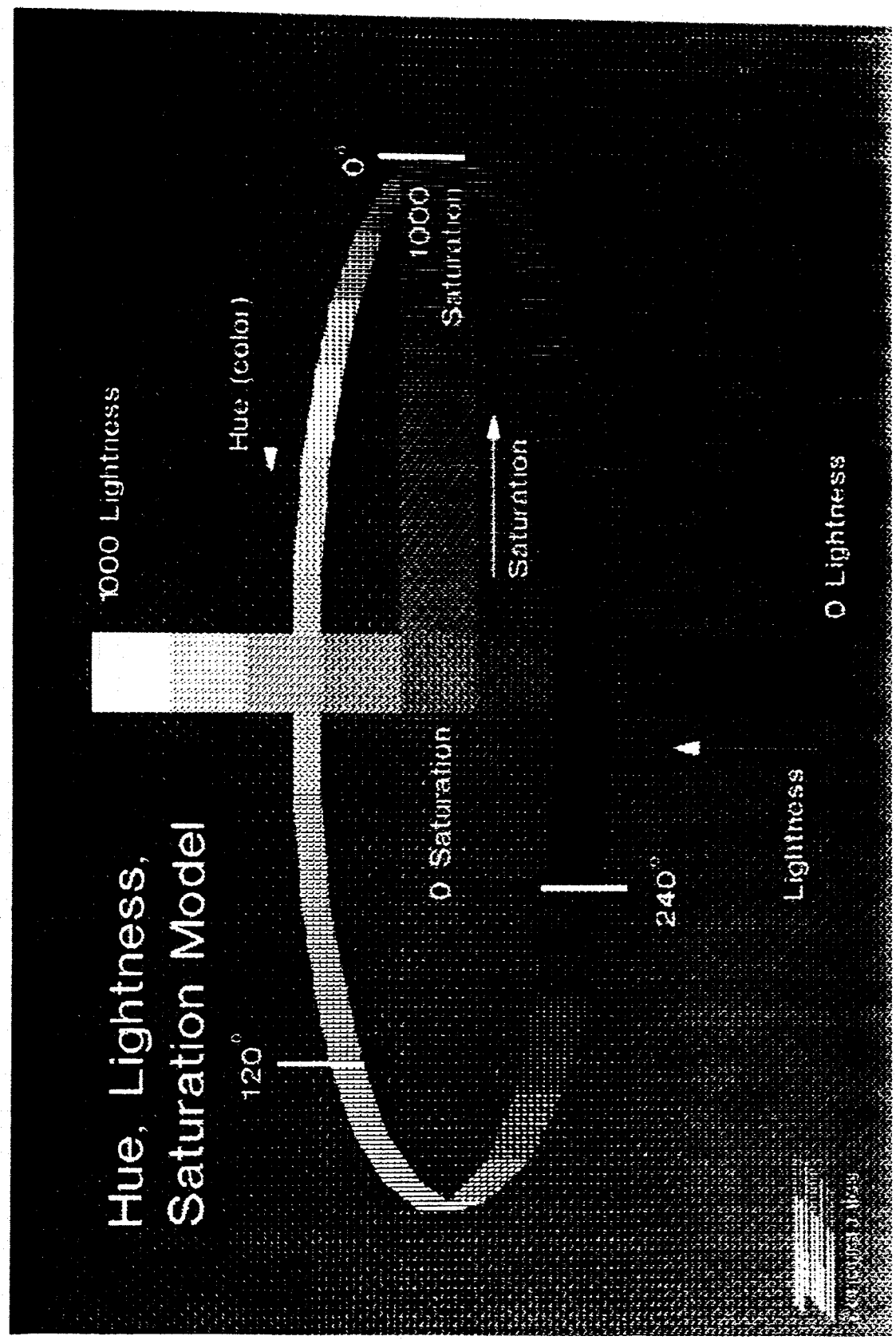
FIG. 3 illustrates a textured version of the Hue-Lightness-Saturation color model.

FIG. 3 illustrates a textured rendition of the hue-lightness-saturation color model. As one moves around the circle of saturated colors, there is a continuous variation of patterns. Likewise as one varies saturation and lightness in the color model, a continuous variation of patterns is encountered.

Figure 4:
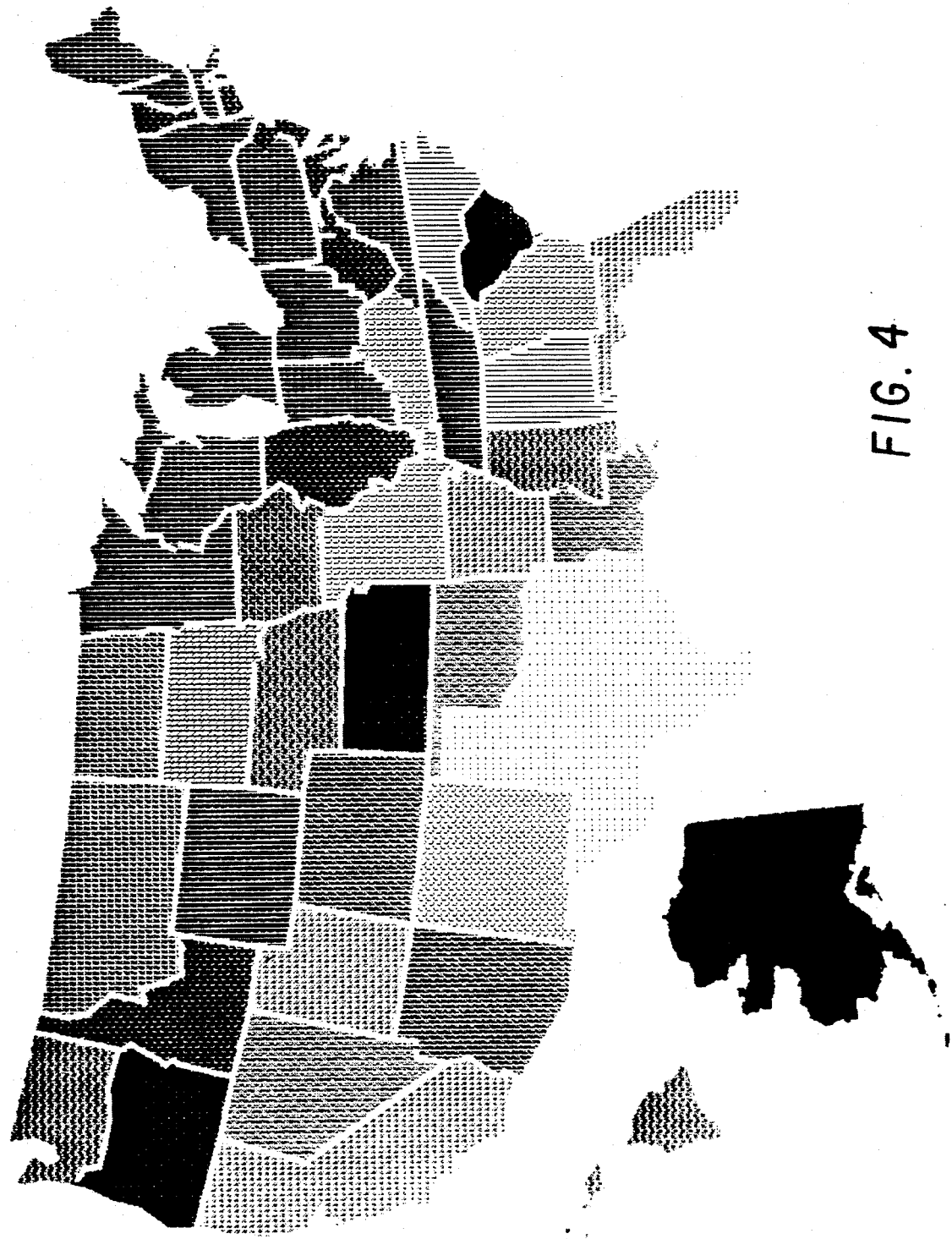
FIG. 4 illustrates a textured version of a map of the United States.

FIG. 4 illustrates a textured version of a colored map of the United States. As illustrated in the figure, the different states are easily distinguished using the textured mapping. Luminance can be distinguished and, even when the luminance between states appears identical, the textured mapping enables the different states to be distinguished.

Figure 5:
FIG. 5 illustrates a textured version of a pictorial image.

FIG. 5 illustrates the effect of the textured mapping on a pictorial image. By mapping color images to black and white on a pixel-by-pixel basis, this mapping scheme can be used with any color image. The scheme does not require knowledge of the geometric boundaries of areas to be filled with textured patterns.

Figure 6:
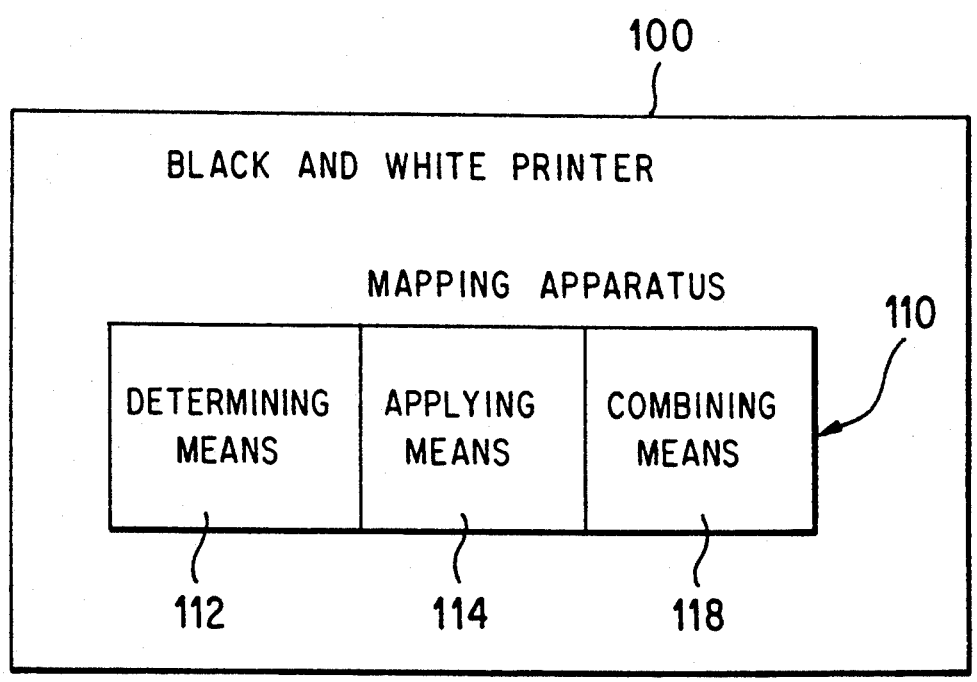
FIG. 6 is a block diagram of a device which can be used to map color images to textured black-and-white images.

FIG. 6 illustrates a device which can be used to perform the above-described mapping operation. Black-and-white printer 100 can include a mapping computer 110. Computer 110 includes a determining means 112 which determines the amount of each of a plurality of color components, e.g., red, green and blue, in a color image on a pixel-by-pixel basis. Computer 110 further includes an applying means 114 for applying each of the plurality of color components to its own halftone screen, each halftone screen being comprised of a plurality of cells. Cell areas of each halftone screen have been allocated to a single color component off-line to determine the halftone texture patterns in accordance with the location of the allocated cell areas. Computer 110 further includes combining means 118 for combining the halftone screens of the color components to yield a black-and-white textured image. Combining means 118 can comprise OR gates for combining the results of the individual component half-tones to provide a final value for display.

The above described method and apparatus provides a mapping of color images to black-and-white images on a pixel-by-pixel basis. The textured patterns vary smoothly over color space. An area which changes smoothly from one color to another will therefore yield an area in which texture also changes smoothly. The mapping can be designed to preserve luminance information as well as assign distinct textures to different hues. Thus, light colors remain light in appearance and dark colors remain dark in appearance. Pictorial images can further be displayed using the texture mapping, yielding recognizable images with only a slightly reduced image quality attributable to the presence of the textured patterns.

The black or white value of a pixel depends solely on the color of that pixel and is independent of the values of neighboring pixels. It is therefore possible to change the color of a portion of an image and to derive the corresponding texture pattern for this area without having to process the unchanged part of the image. The method and apparatus can therefore be used in applications where a scene is constructed incrementally or modified. An example of such use is using a black-and-white monitor to display editing operations on a colored image.

While this invention has been described in conjunction with specific embodiments thereof, it is evident that many alternatives, modifications and variations will be apparent to those skilled in the art. For example, the mapping could be used in a two-ink highlight color printer to provide smooth variation between image areas while providing distinctness in variations in hue, luminance, etc. The mapping could be accomplished using conventional film processing techniques, etc. Accordingly, the preferred embodiments of the invention is set forth herein are intended to be illustrative, not limiting. Various changes may be made without departing from the spirit and scope of the invention as defined in the following claims.

What is claimed is:

1. A method of mapping an image comprised of a plurality of pixels from color to black-and-white, the method comprising the steps of:

on a pixel-by-pixel basis, determining the amount of each of a plurality of color components in a color image;

applying each of the plurality of color components of each pixel to its own halftone screen, each halftone screen being comprised of a plurality of cells;

allocating certain cell areas of each halftone screen to a single color component to yield corresponding texture patterns, in accordance with the location of the allocated cell areas; and combining the halftone screens of the color components of each pixel to yield a black-and-white textured image representing at least two of hue, luminance and saturation of each color component in the color image.

2. The method as recited in claim 1, wherein:

said determining step includes determining the amounts of the red, green and blue color components in the color image.

3. The method as recited in claim 1, wherein:

said allocating step includes allocating cell areas according to the luminance contribution of each color component.

4. An apparatus for mapping an image comprised of a plurality of pixels from color to black-and-white comprising:

determining means for determining the amount of each of a plurality of color components in a color image on a pixel-by-pixel basis;

applying means for applying each of the plurality of color components of each pixel to its own halftone screen, each halftone screen being comprised of a plurality of cells, certain cells areas of each halftone screen having been allocated to a single color component to yield corresponding texture patterns in accordance with the location of the allocated cell areas; and combining means for combining the halftone screens of the color components of each pixel to yield a black-and-white textured image representing at least two of hue, luminance and saturation of each color component in the color image.

5. The apparatus as recited in claim 4, wherein:

said determining means determines the amounts of the red, green and blue color components in the color image.

6. The apparatus as recited in claim 4, wherein:

the cell areas have been allocated according to the luminance contribution of each color component.

* * * * *